United States Patent [19]

Blossey et al.

[11] Patent Number: 6,057,930
[45] Date of Patent: May 2, 2000

[54] ARCHITECTURE FOR A DIGITAL COPIER AND PRINTER FOR HANDLING PRINT JOBS ASSOCIATED WITH A NETWORK

[75] Inventors: Daniel F. Blossey, Penfield; James C. Campbell, Fairport; William K. Stumbo, Fairport; Dennis B. Ulrich, Fairport, all of N.Y.

[73] Assignee: Xerox Corporation, Stamford, Conn.

[21] Appl. No.: 09/149,682

[22] Filed: Sep. 9, 1998

[51] Int. Cl.[7] ....................................................... H04N 1/32
[52] U.S. Cl. ............................................ 358/1.15; 358/468
[58] Field of Search ...................................... 358/401, 471, 358/296, 468; 395/114, 115, 112, 116

[56] References Cited

U.S. PATENT DOCUMENTS

| | | | |
|---|---|---|---|
| 5,170,340 | 12/1992 | Prokop et al. | 364/143 |
| 5,327,526 | 7/1994 | Nomura et al. | 395/115 |
| 5,524,085 | 6/1996 | Belluco et al. | 364/514 |
| 5,675,719 | 10/1997 | Matias | 395/115 |
| 5,715,379 | 2/1998 | Pavlovic et al. | 395/112 |
| 5,718,520 | 2/1998 | Mac Kay | 400/61 |
| 5,768,489 | 6/1998 | Adachi | 395/117 |

*Primary Examiner*—Jerome Grant, II
*Attorney, Agent, or Firm*—Paul F. Daebeler

[57] ABSTRACT

A digital copying and printing system associated with a computer network for prioritizing and executing copy and print jobs. Two central processing units share the prioritizing and interpreting of copy and print jobs, so that the copy and print jobs are performed in a highly efficient manner.

5 Claims, 2 Drawing Sheets

ARCHITECTURE FOR A DIGITAL COPIER AND PRINTER FOR HANDLING PRINT JOBS ASSOCIATED WITH A NETWORK

FIELD OF THE INVENTION

The present invention relates generally to prioritizing and handling print jobs of electronic documents, which are received in a printer from an input scanner and at least one computer.

BACKGROUND OF THE INVENTION

Input scanners, personal computers and other electronic document generating devices have become commonplace tools for most office workers. Typically, much of the work product of such devices is intended to be transformed into hardcopy via a printer using digital imaging technology. A typical printer configuration for this purpose comprises a dedicated printer coupled to the personal computer ("PC"). However, printers used for this purpose are typically small laser or ink-jet printers, which have limited functions and features such as a limited tray capacity which restricts the number and types of copy sheets that can be used to make prints on, or which do not have a finishing capability, etc. More importantly small laser printers also typically handle only one page description language (PDL), and do not have a document scanning capability for scanning and printing documents.

On the other hand, larger high speed laser printers normally have a great deal of finishing and copy sheet capability which would allow the PC user to have, for example, custom printing and finishing of his or her work product, an option which for many office workers would be desirable. In practice, the PCs can be used advantageously with a network printing system of the type combining a number of client inputs, such as input scanners, PCs, workstations, or the like, and one or more printer outputs. In one example of such network printing systems, a client at one of the inputs sends electronic documents that comprise a job over a local area network (LAN) to one of the printers selected for printing the job. In particular, LANs provide a means by which users running dedicated processors are able to share resources such as printers, file servers and scanners. Integration of shared resources has been a problem addressed by LAN managers. LAN managers have made different network protocols such as Ethernet and Token Ring transparent to devices running different network protocols. LANs also have a variety of print drivers emitting different PDLs, which are directed to specific printer devices. In addition, different input scanners also have different PDLs.

With any PDL or image format, there will inevitably be a step of "decomposition" of the PDL or image format data into a form usable by an output device, such as a laser printer. Printing hardware requires a stream of binary data to be input into it. Thus, the instructions within the image format, such as to "print a white line," will eventually have to be translated into the actual binary code so that, for example, this code can be applied to the modulation of a laser source in a raster output scanner, or applied sequentially to individual ejectors in an inkjet printer. The decomposition of PDLs and printing of jobs requires setting priorities and managing resources.

In the prior art, U.S. Pat. No. 5,170,340 discloses an electronic reprographic system having a plurality of hardware and software system components, which a control system construes as various virtual machines. There is included in the system a scheduler for managing resources and setting priorities for various virtual machines defined by the system to process job requests in an efficient manner. The scheduler causes memory from a first virtual machine in the system to be distributed to a second virtual machine in the system when the second virtual machine requests more memory than is normally allocated to it.

U.S. Pat. No. 5,327,526 discloses a print job control system which processes print requests to set an order of priority for printing print jobs. A print job manager checks the print request and determines which print option is selected and manipulates the queue identifier associated with print jobs and enters them into a print queue table.

SUMMARY OF THE INVENTION

According to the present invention, there is provided an apparatus for controlling the execution of copy and print jobs. First and second processing units are operatively coupled to prioritize and print the copy and print jobs in an order to be executed. An image output terminal is operatively coupled to the second processing unit and receives and prints copy and print jobs in the order to be executed.

DETAILED DESCRIPTION OF THE PRESENT INVENTION

Figure 1:
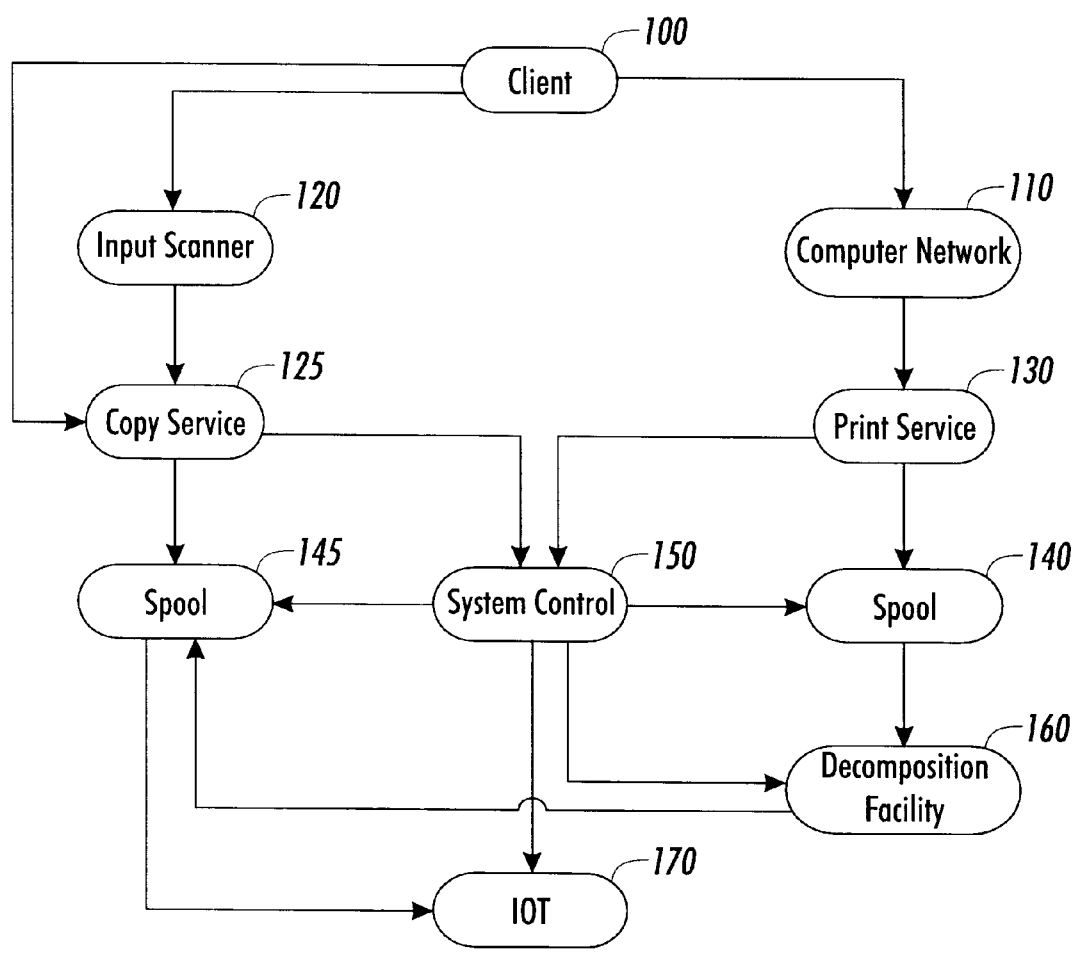
FIG. 1 is a flow diagram showing a general overview of an on-demand network printing system of the present invention.

Referring to FIG. 1, a client, indicated as 100, has a print job to be submitted to the printing system. This job is typically in the form of a file, which is expressed in one of many different commercially available formats. Typical of such formats are the page description languages or PDLs, such as PostScript or HP-PCL (Hewlett Packard—Page Composition Language) and their respective variants, as well as other formats such as TIFF (Tagged Image File Format) or ASCII. As used in the present description and claims, a "PDL" will refer to any set of image data submitted for printing, regardless of whether it is in the form of a commercially available PDL such as HP-PCL or PostScript, or in another format such as TIFF or ASCII. ("PostScript" is a trademark of Adobe, Inc.) It is also conceivable that a job to be printed could exist in compressed or uncompressed binary form.

For large-scale on-demand printing systems, the client 100 is one of several clients which each access a computer network 110, which enables the client 100 to contact the printing system as, desired. Typically, a computer network 110 includes a plurality of workstations from which the client may access the computer network 110. Further, several printing systems may exist on a network, and an individual client having a job to be printed will select a printing system capable of handling his or her particular job. The printing system preferably includes an input scanner 120 so that clients may use the printing system as a copier as well as a printer.

A printing system on a computer network 110 includes a print service 130, which receives the submitted job from client 100 through computer network 110. The "job" is in the form of at least two portions: the PDL itself, that is the data desired to be printed, and a "job description" on which the client 100 has specified certain instructions for printing the job. This job description could include, for example, a specification of how many copies of the print are to be made, on what size and color of paper the prints are to be made, into what tray the prints are to be inserted, whether the prints are to be duplexed, collated, stapled, or otherwise finished, etc. The data comprising the job description can include instructions in a "job ticket" separable from the portion of the PDL which defines the image data, and also can include instructions which are embedded within a PDL file.

The print service 130, having received the PDL and the associated job description, directs the PDL to a spool 140 and at least some of the job description data to a system control 150. The PDL retained temporarily in spool 140 preferably remains in the form in which it was submitted, such as in PostScript, HP-PCL, or in another form such as TIFF or ASCII. The PDL is preferably retained in spool 140 until it is, in the case of data in a PDL, decomposed into a form usable by printing hardware. This decomposition, or other interpretation, is performed by a decomposition facility 160, which may include several independently operable decomposers, each dedicated to a different PDL. The decomposition facility 160 is under the control of system control 150. After decomposition of the image data in the PDL format is completed, the system control 150 compresses and stores the decomposed image data in spool 145.

As indicated above, the printing system on a computer network 110 preferably includes an input scanner 120 and a copy service 125, which receive walk-up jobs (copy jobs) directly from the client 100 through a user interface (not shown). The user interface permits the client to provide a job description including a job ticket to the copy service 125, while the input scanner 120 scans documents provided by the client 100 in accordance with the job description. The copy service 125, having received the scanned image data and the associated job description, provides the scanned image data to spool 145 and the associated job description to the system control 150. Then, the scanned image data is compressed and stored in spool 145 along with the job description under the control of the system control 150.

System control 150 is also the site in which certain other functions, such as scheduling a plurality of individual jobs, or determining what available printing hardware is capable of carrying out the desired requirements of a particular job, are carried out. Based on this schedule, the system control 150 decompresses the image data for the scheduled job and makes the data available to image output terminal (IOT) 170. System control 150 interprets the desired specifications from the job description associated with the image data stored in spool 145 to control the image output terminal 170. Moreover, although only one image output terminal 170 is shown in FIG. 1, the system control 150 may be connected to a plurality of image output terminals, and the system control 150 may control which image output terminal is used based upon the job description.

Figure 2:
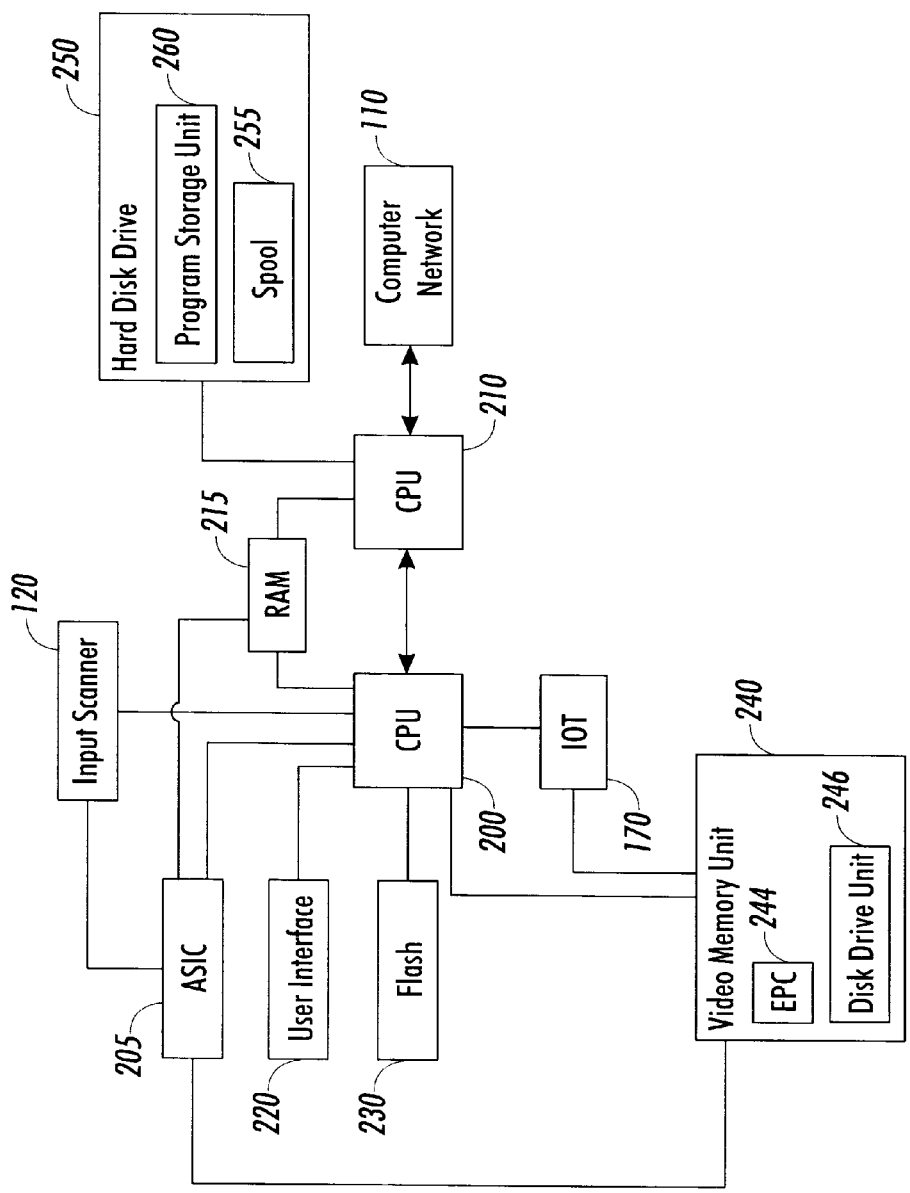
FIG. 2 is a systems diagram showing the basic elements of a preferred embodiment of a print job handling system according to the present invention.

FIG. 2 shows the preferred embodiment of the digital copying and printing system of the present invention which includes a two central processing unit (CPU) architecture. CPU 200 and CPU 210 are connected by a bus and share the responsibilities of processing print jobs requested by client 100. For example, CPU 200 receives copying instructions from a client 100 through user interface 220 and controls the input scanner 120 to obtain and to transmit image data to the video memory unit 240. The video memory unit 240 includes an electronic prelocation memory (EPC) 244 and disk drive unit 246. The image data, which is transmitted from the input scanner 120, is stored in EPC 244.

Input scanner 120 is a device familiar in digital copiers and facsimile machines. The input scanner 120 includes a linear array of photosensors on which a moving image from an original hard-copy document is focused. As different small areas of the original hard-copy document pass relative to various photosensors in the linear array, the photosensors output data relating to the light intensity of the various small areas on the original document. CPU 200 controls an application specific integrated circuit (ASIC) 205, which retrieves the image data stored in the EPC 244, compresses the image data using a compression algorithm well known in the art, and then stores the compressed image data in the disk drive unit 246. Alternatively, the CPU 200 may direct the input scanner 120 to provide the scanned image data to the ASIC 205 for immediate compression and storage in the disk drive unit 246. The flash 230 stores the software programs, which are executed by the CPU 200, for controlling the ASIC 205, user interface 220, input scanner 120, video memory unit 240, image output terminal 170, and RAM 215.

CPU 210 receives image data representing electronic documents generated by clients working on computer network 110. The image data is stored in one of the PDL formats, which is common in the printing industry (e.g. PostScript™; HP-PCL; ASCII and TIFF). A hard disk drive 250 includes a spool 255, which is used to temporarily store the image data in a PDL format for processing. The CPU 210 processes the image data based upon software stored in a program storage unit 260, which is part of hard disk drive 250. If all of the image data is text, then it is unnecessary to decompress the image data. However, if there is image data wrapped in a PDL format, which represents charts, tables, graphs, figures, etc., then the CPU 210 will decompress these types of image data.

In addition, several computer software programs called decomposers may be stored in program storage unit 260. As is generally known in the art of digital printing, a decomposer also known as an interpreter, is a computer software program which translates image data from a PDL format into a form of data which can be directly operative on a image output terminal 170, which is directly involved with forming a hard-copy of the electronic document. The CPU 210 can detect the type of PDL format of the image data and apply the correct decomposer to properly decompose or translate the image data into a form, which can be utilized by the printing system. For example, if PDL says print the letter A in 10 pt Roman. In response to the instruction, the decomposer submits to the printing system a set of 1's and 0's which would cause the letter A in 10 pt Roman to appear on a piece of paper. The shared random access memory (RAM) 215 may be utilized to decompose and temporarily store the decomposed image data. Then, CPU 200 retrieves the decomposed image data, directs the ASIC 205 to compress the decomposed image data and store the compressed image data in the disk drive unit 246.

In addition, based on criteria stored in the program storage unit 260, the CPU 210 determines the priority of print jobs of electronic documents received from the computer network 110. For example, the priority of a job may depend on the submission time of jobs, the workstation, or the client. The system administrator usually determines this.

The CPU 200 determines the priority of print jobs between the image data received from the input scanner 120 (walk-up jobs) and the compressed image data transmitted from RAM 215 (network jobs). CPU 200 advises CPU 210 as to the status and capabilities of the image output terminal 170, which is performing the direct conversion of the electronic document to the hard-copy document, so that the decomposed image data can be transmitted to the RAM 215 when CPU 200 can make the resources available for compressing, storing and then printing the job. Once the image output terminal 170 and CPU 200 are ready to receive image data, the compressed image data stored in disk drive unit 246 is decompressed by the ASIC 205, and made available to image output terminal 170.

The image output terminal 170 can be any hardware device for placing marks on a sheet in response to decomposed image data. Typical image output terminals include a laser printer, or an ink-jet printer. In the case of a typical laser printer, a laser is modulated, or in other words turned on and off rapidly, in response to decomposed digital image data applied thereto. The modulated laser is caused to reflect off of the facets of a rotating mirror, which causes the laser to scan across a charged photoreceptor in a scan direction perpendicular to the motion of the photoreceptor. The interaction of the image data with the laser moving across the photoreceptor discharges those areas on the photoreceptor generally corresponding to "print white" areas on the photoreceptor to record an electrostatic latent image on the photoreceptor. The latent image is developed with marking particles to form a powder image on the photoreceptor. The powder image is transferred and fused to a print sheet. In the case of an inkjet printer, typically a relatively small printer having a linear array of selectably-actuable inkjet ejectors is caused to move in swaths across a print sheet, and during the motion of the printhead across the sheet, various ejectors are caused to eject droplets of ink at predetermined locations on the print sheet, thereby forming a desired image based on the decomposed digital image data.

In either case, the image data must be translated into a form, which is directly operative of the image output terminal 170 (e.g. laser or inkjet printer) in order to create the desired image. It is also common for the image output terminal 170 to accept special command and control codes for certain functions, such as an end of page code, which would instruct the image output terminal 170 to immediately output whatever page it is printing on, or a start page code, which instructs the printing hardware to draw another print sheet from a supply stack.

Image output terminal 170 may respond to many sets of instructions as to exactly how the finished job is desired. For example, a typical high-volume printer may include any number of means of "finishing" the prints, such as stapling or binding. Further, a job may require a combination of different types of available print stock, such as colored papers, tab stock and cardboard covers. All of these finishing requirements, which are present on the original job description data (such as on a separate job ticket or embedded in the file) submitted to print service 130, are ultimately carried out by image output terminal 170, which has the individual motors and paper drivers for generating a hard copy or hard print out of the electronic document. The software inputs to image output terminal 170 include a quantity of job description information, which CPU 200 submits to image output terminal 170, based upon the instructions of client 100. Among these job description instructions received by image output terminal 170 are the output destination for what trays in which the finished parts are to be deposited; the finishing requirement, such as stapling binding, etc; and the number of copies required. Other job description data could include whether or not the job is intended to be duplexed, and what type or combination of types of paper stock is desired. It is fairly typical that printing a booklet, for example, will require white regular weight stock for the inner pages, and heavier colored stock for the cover. Many of these job description instructions submitted to image output terminal 170 will be manifest in specific instructions to the hardware of the image output terminal 170, such as obtaining paper of a particular type from one stack or another as the job is being printed.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

We claim:

1. An apparatus for controlling the execution of copy jobs and print jobs, transmitted from an input scanner and from workstations on a computer network by at least one client, said apparatus comprising:

a first central processing unit receiving the print jobs from the computer network in a page description language, and prioritizing the print jobs in the order to be executed;

a second central processing unit, coupled to the first central processing unit and receiving the copy jobs from the input scanner and the prioritized print jobs from the first central processing unit;

the second central processing unit determining the order in which the copy jobs and prioritized print jobs are to be executed; and an image output terminal operatively coupled to the second central processor, and controlled by the second central processor, to print the copy and print jobs in the order to be executed.

2. The apparatus as in claim 1, wherein the first central processing unit prioritizes print jobs based upon predetermined criteria including submission time, the workstation or the client.

3. The apparatus as in claim 1, wherein the page description language is selected from a group consisting of HP-PCL; Postscript; ASCII; and TIFF.

4. The apparatus as in claim 1, wherein the first processor decomposes the page description language into a format, which is directly operable on the image output terminal.

5. The apparatus as in claim 4, wherein the second processor receives the print jobs in the decomposed page description language from the first central processing unit.

* * * * *